Figure 1:
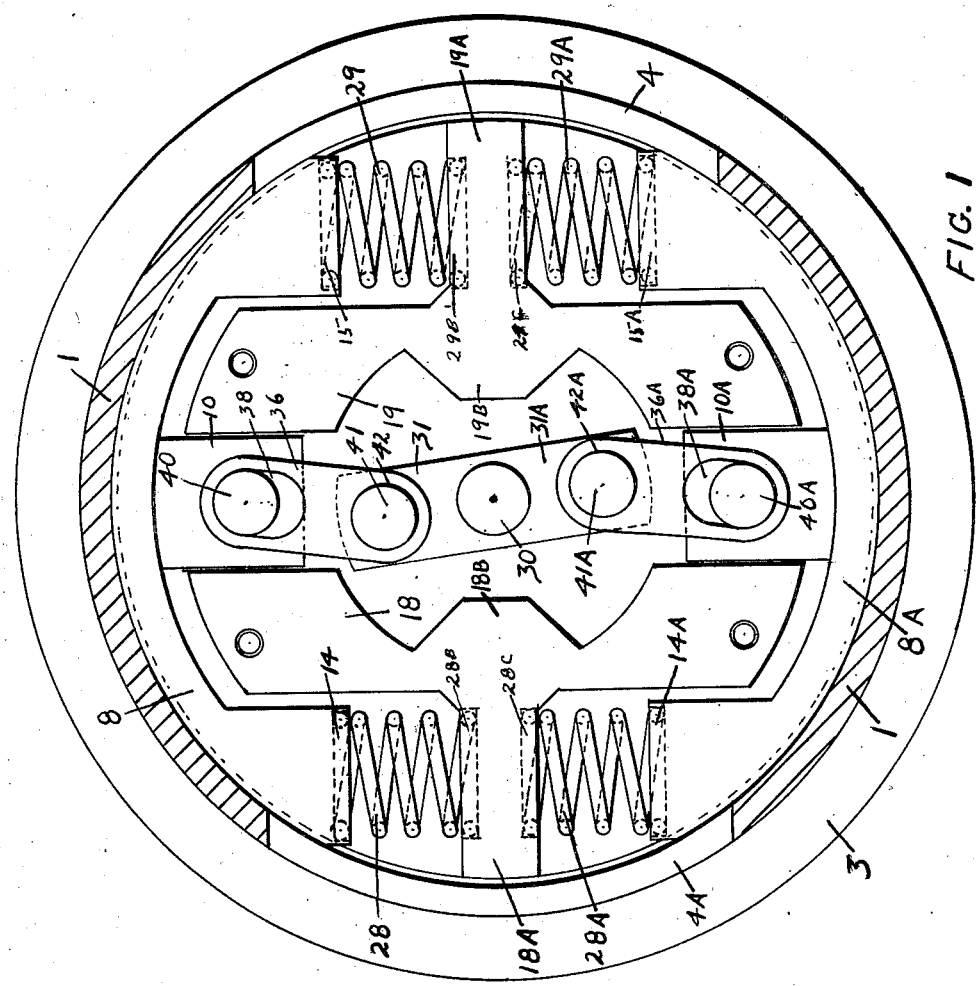

Feb. 18, 1936.   A. L. STILL   2,031,186
AUTOMATIC BRAKE
Filed July 12, 1935   4 Sheets-Sheet 1

INVENTOR.
Andrew L. Still

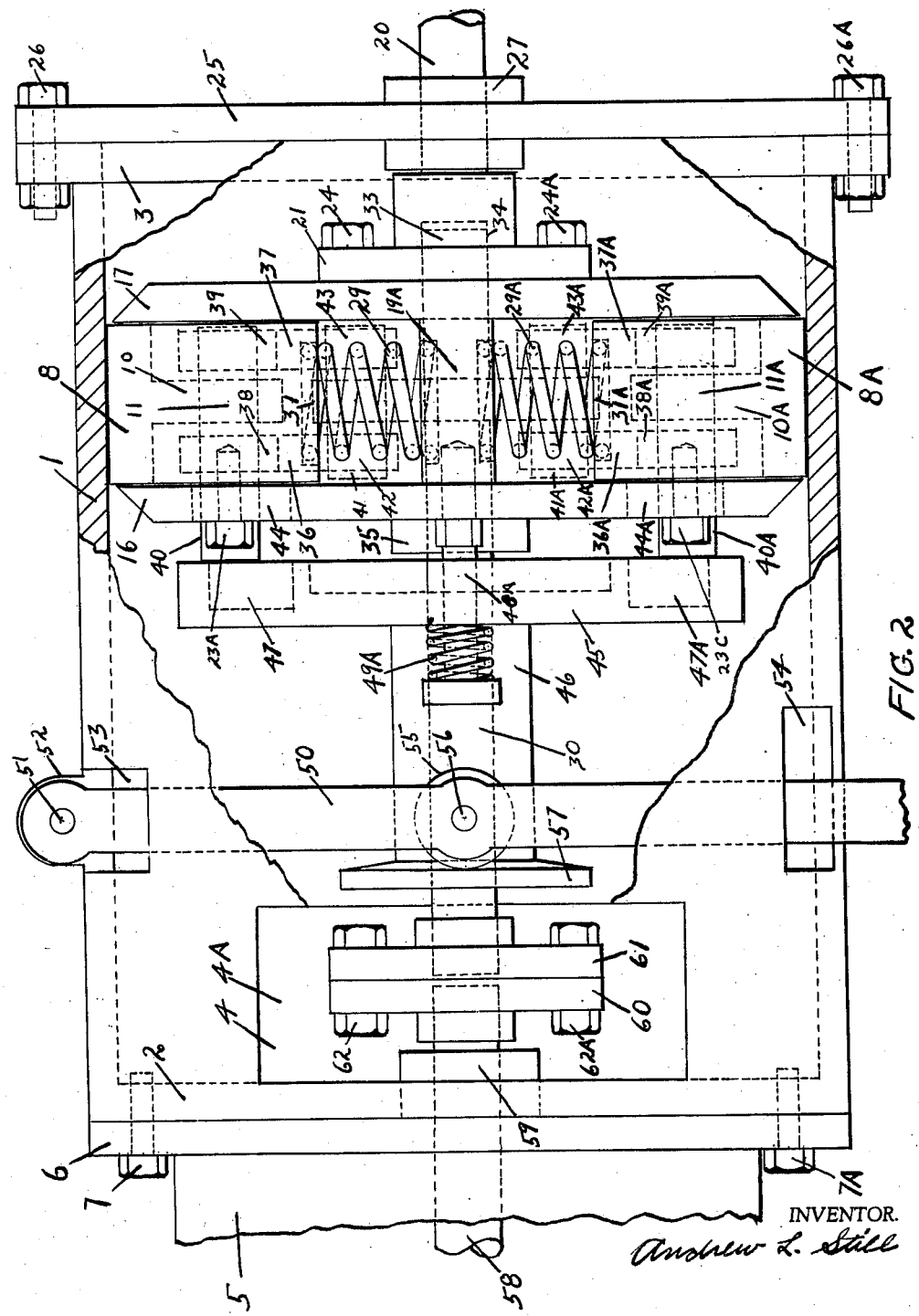

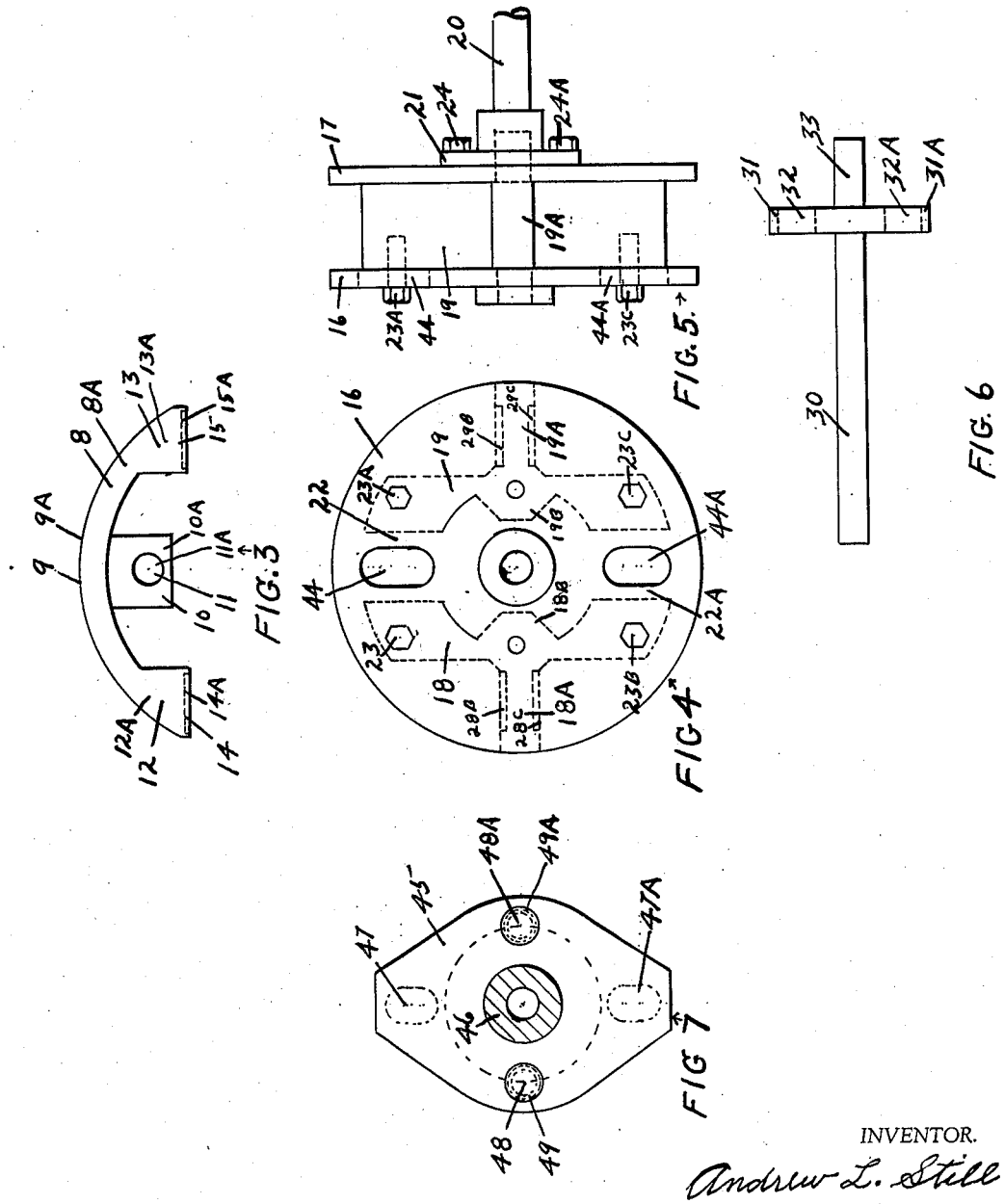

Feb. 18, 1936.  A. L. STILL  2,031,186
AUTOMATIC BRAKE
Filed July 12, 1935  4 Sheets-Sheet 4
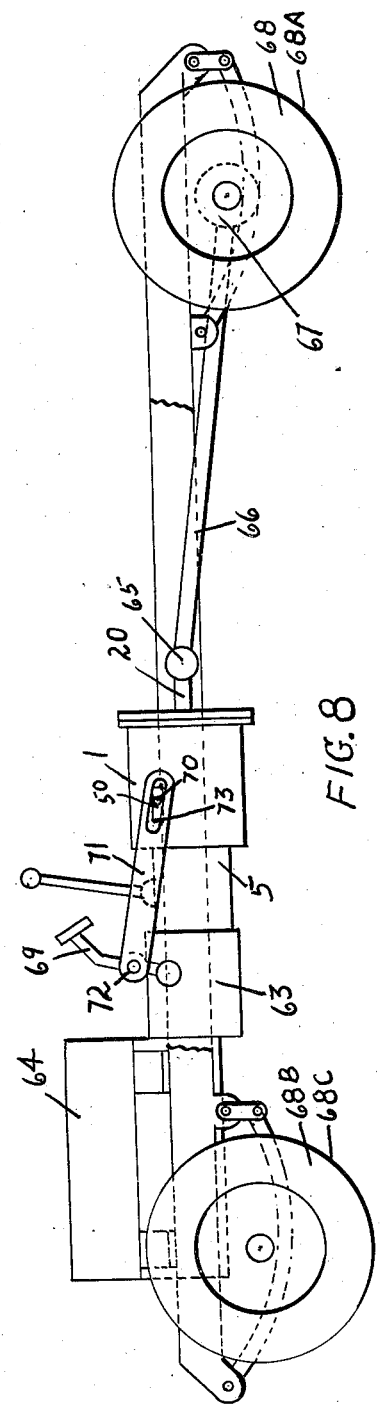
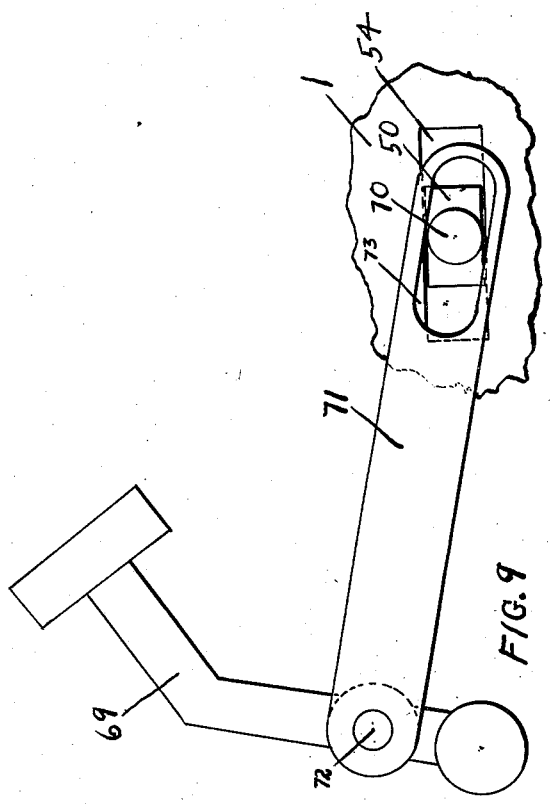
INVENTOR.
Andrew L. Still Patented Feb. 18, 1936

2,031,186

UNITED STATES PATENT OFFICE 2,031,186

AUTOMATIC BRAKE

Andrew L. Still, Los Angeles, Calif.

Application July 12, 1935, Serial No. 31,047

5 Claims. (Cl. 192—13)

The object of this invention is a brake which will automatically bring a motor vehicle to a complete stand still when the engine of the motor vehicle discontinues to exert a torque in either direction on the propelling shaft or axle, and will release the brakes when a torque is exerted on the propelling shaft or axle, an automatic lock which will lock the brakes in a disengaged position so that while the engine does not exert a torque on the propelling shaft during the shifting of gears the brakes are held in a disengaged position, and a trigger which will release the lock when it is not desirable to lock the brakes, a more specific description may be had by referring to the accompanying drawings. Figure 1 is an end view of the automatic brake with certain members not included, Figure 2 is a side view of the automatic brake with portions of the brake drum "cut out" in order to more clearly illustrate the brake drum and the shoes 8 and 8a, and the plates 45, Figure 3 is a side view of the brake shoe 8 and 8a, Figure 4 is an end view of the brake shoe holder, Figure 5 is a side view of the brake shoe holder, Figure 6 is a side view of the shaft 30, Figure 7 is an end view of plate 45, Figure 8 is a side view of a motor vehicle with part of the frame "cut out" in order to more clearly describe the automatic brake assembled in a motor vehicle, Figure 9 is an end view of the trigger lever and a side view of the clutch lever as they are related.

Referring to Figures 1 and 2. Brake drum 1 includes the end flanges 2 and 3, the hand holes 4 and 4a. The brake drum is supported by a conventional type gear transmission box 5 of a conventional motor vehicle. The gear box includes the flanges 6, flange 2 is secured to flange 6 by screws 7 and 7a. The section of brake drum 1 between the hand holes and the flange 3 is adapted as bearing surface for the brake shoes 8 and 8a.

Referring to Figure 3. The brake shoes 8 and 8a are identical and the drawing Figure 3 represents both shoes. The shoes 8 and 8a respectively include the curved outer surface 9 and 9a, the under projections 10 and 10a and the holes 11 and 11a in the projections 10 and 10a. The flat under surfaces of these shoes 12 and 12a, 13 and 13a and the spring seats 14, 14a and 15, 15a. The curved outer surfaces of these shoes are adapted to bear on the inner surface of the brake drum 1 and the shoes are interlocked in a brake shoe holding member within the brake drum 1 as shown in Figure 1.

Referring to Figures 4 and 5 the brake holding member includes the plates 16 and 17 and the guides 18 and 19 and the spring supports 18a, 19a and shaft 20. The guides 18, 19 and the spring supports 18a, 19a are either one piece of material with plate 17 or may be secured to the said plate by any suitable means. The guides are spaced on the plate 17 parallel to each other and spaced apart an equal distance from the center of plate 17 so that the spaces 22, 22a are between the two guides. Spring supports 18a, 19a extend on right angles from the guides to the periphery of the plate 17 and are spaced in relation to the guides so that a center line drawn through the spring supports will pass through the center of plate 17 and said center line at right angles to the center line between the guides 18 and 19. The plate 16 is secured to plate 17 by screws 23, 23a, 23b, 23c and shaft 20 is secured to plate 17 by screws 24, 24a. The spaces 22, 22a as seen in Figure 4 are adapted to receive the projections 10, 10a respectively of shoes 8, 8a respectively and the space between the plates 16 and 17 is adapted to receive the body of the shoes 8 and 8a sufficient clearance between the shoes and the guide members so that the shoe may move inwards towards the center of plate 17 and vice versa.

Referring to Figure 2. Plate 25 is secured to flange 3 by screws 26, 26a and bearing 27 is supported by the said plate in a central position on the end of brake drum 1. The bearing 27 is adapted to receive shaft 20 and to support the brake shoes holding members concentrically within the brake drum.

Referring to Figure 1. The springs 28, 28a, 29, 29a are adapted to rest on spring supports 18a, 19a and to push on the under side of shoes 8 and 8a so that these shoes bear on the inner surface of brake drum 1.

Referring to Figures 1 and 2. When springs 28, 28a, 29, 29a push shoes 8 and 8a against the inner surface of brake drum 1 with sufficient pressure the shaft 20 may not be turned. The shoes and the spring supports include the spring seats 28B, 28C, 29B, 29C, 14, 14a, 15, 15a. These seats hold the springs 28, 28a, 29, 29a in place.

Referring to Figure 6. The drive shaft 30 includes the arms 31, 31a the holes 32, 32a and the extension 33 beyond the said arms.

Referring to Figures 2 and 1. The shaft extension 33 is inserted in bearing 34 in plate 17 and shaft 20, the shaft 30 is also supported by bearing 35 in plate 16 so that the arms 31, 31a are on the shaft between the plates 16 and 17.

Referring to Figures 1 and 2. Connecting links 36, 36a, 37, 37a include the elongated holes 38, 38a, 39, 39a respectively, the links 36, 37 are connected to shoe 8 by inserting pin 40 in the link holes 38, 39 and shoe hole 11 so that one link is on either side of the shoe projection 10. Links 36a, 37a are connected with shoe 8a by inserting pin 40a in link holes 38a, 39a and 11a so that one link is on either side of the projection 10a. The two sets of links are connected to arms 31, 31a by inserting pins 41, 41a respectively in holes 42, 32, 43 and 42a, 32a and 43a.

The holes 38, 38a, 39, 39a are elongated so that the arms 31, 31a may swing in either direction off of the dead center line under the shoes 8 and 8a without hindrance from the connecting links and so that the shoes 8 and 8a may wear and so that the connecting links will not hinder the springs from forcing the shoes to bear on the brake drum after the shoes 8 and 8a have worn down within certain limits.

When a torque is exerted on drive shaft 30 the arms 31, 31a are moved in the direction of the torque until the links 36, 37, 36a, 37a bear on the pins 40, 40a respectively, as they continue to move, the shoes 8 and 8a are pulled inwards away from the inner surface of the brake drum 1 and the springs 28, 28a, 29, 29a are compressed, this motion continues until the torque which compresses the said springs equals the torque necessary to turn shaft 20, then the shoes 8, 8a, the guides 18, 19, plates 16, 17, shaft 20 and all things connected or secured to the said members will revolve with the shaft 30. When the torque necessary to drive shaft 20 exceeds the torque necessary to compress the springs 29, 29a, 28, 28a the said action continues until the arms 31, 31a bear on the guide projections 18b, 19b then the said shoes and the said other members will all turn with the shaft 30. In the way above described the brake shoes are automatically disengaged by means of exerting a torque on the drive shaft 30, it may be noticed that the drive shaft 30 disengages the brake shoes before a torque is exerted on the shaft 20 in either direction. The said torque exerted in either direction will cause the brake shoes 8 and 8a to be pulled away from the inner surface of brake drum 1 due to the elongated holes in the links 36, 37, 36a, 37a making it possible for the arms 31, and 31a to be moved in either direction off of the center line of the said brake shoe.

When a torque is discontinued to be exerted on the drive shaft 30 the shoes 8, 8a are forced by compression springs 28, 29, 28a, 29a to bear on the inner surface of brake drum 1. While the shoes 8 and 8a are moved towards the inner surface of brake drum 1 these shoes pull on connecting links 36, 37, 36a, 37a and the shaft 30 is turned back a fraction of a revolution in relation to the shaft 20. In this way the brakes are automatically engaged when a torque is discontinued to be exerted on the drive shaft 30 and the shaft 20 may not be moved after the brake shoes 8 and 8a have brought the mechanism to a stand still.

The brake action is governed by a trigger so that the brake shoes may be locked in a disengaged position until it is desired to have the brake shoes to automatically bear on the brake drum. Refer to Figures 4 and 2. Plate 16 includes the holes 44, 44a. Pins 40, 40a extend through the said holes beyond the plate 16, these holes 44, 44a are elongated so that the brake shoes 8 and 8a may be moved away from the brake drum and vice versa without hindrance from plate 16.

Referring to Figures 2 and 7. The plate 45 is secured to bearing 46 or may be one piece of material with the said bearing. The bearing 46 is adapted to fit on shaft 30 and to hold the plate 45 in relation to a central position on the shaft 30. Plate 45 includes elongated holes 47, 47a, these holes are positioned in the plate 45 so that the distance from the center of shaft 30 to the outer side of these holes is less than the distance from the center of shaft 30 to the outer side of pins 40, 40a so that when the shoes 8 and 8a are bearing on the brake drum 1 the holes 47, 47a may be in line with the pins 40, 40a but offset from said pins. The plate 45 is held in position in relation to pins 40, 40a by pins or screws 48, 48a which are secured to plate 16, the compression springs 49, 49a are held in place by the said screws when the shaft 30 and arms 31, 31a pull the shoes 8 and 8a away from the brake drum the pins 40, 40a are brought inwards until the outer side of the pins 40, 40a are further inward than the outer side of the holes 47, 47a respectively, then the springs 49, 49a force the plate 45 to move towards the plate 16 and the pins 40, 40a are in the holes 47, 47a in this way the brake shoes are automatically locked in a disengaged position. The lever 50 is connected by pin 51 to the lug 52 on brake drum 1 and extends through the slot 53 across the body of the drum through the slot 54 on the opposite side of the said drum 1. Roller 55 is connected to lever 50 by pin 56. Bearing 46 includes the flange 57. The roller 55 is adapted to bear on flange 57 when the end of the lever 50 which extends through the slot 54 is swung in the direction away from the plate 16. When it is desired to have the brakes engaged when the torque is discontinued to be exerted on the shaft 30 the lever 50 moves the plate 45 away from the plate 16 past the ends of pins 40, 40a and the brake shoes are free to automatically move towards the brake drum and to bear on the inner surface of the said drum.

Shaft 58 is a propelling shaft leading from a conventional gear box 5 so that the shaft 58 is concentrically surrounded by the brake drum 1. Shaft 58 is supported by bearing 59 and shaft 58 is secured to shaft 30 by means of flanges 60, 61, and screws 62, 62a. The flanges 60, 61 are secured to the shafts 58 and 30 respectively by any suitable means so that they may be removed to disassemble the automatic brake or replace same after certain parts of the automatic brakes have been assembled. The hand holes 4, 4a exist for the purpose of convenience to secure flange 60 and 61.

It may be noticed that one end of shaft 30 is supported by shaft 20 and the other end is supported by shaft 58 and that the bearing 35 in plate 16 keeps the shaft 30 in alignment with the shaft 20 and that the bearings 27 and 59 support the moving members of the automatic brake.

Referring to Figure 8. The automatic brake as above described is secured to a conventional gear transmission box 5, which in turn is supported by the clutch housing 63, the clutch housing is supported by the engine 64. The engine 64 is connected to the clutch in the clutch housing 63. The clutch is connected to the gears in transmission gear box 5, and the members in the gear box are connected to the automatic brake by means of flanges 61 and 62 as illustrated in Figure 2. The shaft 20 of the automatic brake is connected to the universal joint 65. The propelling shaft 66 is connected to the universal joint 65 on an end and the other end of shaft 66 is adapted to drive the differential gears 67. The differential gears are connected with the back wheels 68, 68a of the motor vehicle which vehicle also has the front wheels 68b, 68c. The clutch in 63 is released by the conventional foot lever 69. The mechanism of engine 64, the clutch in 63, the gear transmission box 5, the propelling shafts, universal joint 65, differential 67, wheels 68, 68a, 68b, 68c are common knowledge and it is believed that it is not necessary to describe these members and their relations except in a general schematic relation to the automatic brake.

The lever 50 of automatic brake ends with the round or ball end 70 as shown more clearly in Figure 9, rod 71 is connected to the clutch lever 69 by pin 72. The rod 71 has one elongated hole 73 on the end opposite to pin 72, hole 73 is adapted to receive the round or ball end of lever 50. When the clutch lever is moved a certain distance as is commonly known the clutch grip is discontinued and the engine does not exert a torque on the transmission gears etc. in this invention the clutch lever pulls the rod 71 until the end of elongated hole is in close proximity to the round end 70 of lever 50 at the same time that the lever is moved to disengage the clutch, after the clutch has been disengaged the lever 69 may be moved further and the rod 71 will pull on the round end 70 of lever 50 and the end of lever 50 is moved in the direction of the pull, therefore using the same lever to actuate the clutch and to unlock the brakes.

Referring to Figure 2. When the lever 50 is moved the plate 45 is pulled away from the plate 16 past the pins 40, 40a and the brake shoes 8 and 8a are free to bear on the brake drum 1.

When it is desired to start the motor vehicle in motion the clutch is thrown out, the gears are meshed in a low ratio, the clutch is thrown in, the gears in the gear box 5 and the shaft 58 and shaft 30, and the arms 31, 31a swing in the direction of the torque and pull the shoes 8 and 8a away from the brake drum 1. When the pins 40, 40a are pulled inwards so that they "jibe" with or are further inward than the outer ends of the holes 47, 47a the springs 49, 49a force the plate 45 against plate 16 and the brake shoes are locked so that they may not be pressed against the inner surface of brake drum 1. After the shoes are pulled away from the inner surface of the brake drum by the torque exerted on shaft 30, shaft 30 drives the shaft 20 and the shaft 20 drives the shaft 66 and the shaft 66 drives the differential 67 and the differential drives the wheels 68, 68a. When it is desired to increase the gear ratio in box 5, the lever 69 is moved sufficiently to disengage the clutch but not so far as to pull the lever 50. After the gear ratio has been increased the lever 69 is moved back and the brake shoes 8 and 8a have not been free to bear on the inner surface of the brake drum 1.

When it is desired to bring the motor vehicle to a stand still after it is in motion, the lever 69 is moved to disengage the clutch and to pull on the lever 50, in this way the plate 45 is pulled away from plate 16 past the ends of pins 40, 40a and the grake shoes are free to bear on the brake drum 1 and to bring the motor vehicle to a stand still.

It may be noticed that the engine is adapted to drive the shaft 30, that the shaft 30 is connected to the wheels of the motor vehicle in order that the engine may propel the vehicle, that the arms 31, 31a connecting links 36, 36a, 37, 37a and the shoes are on the shaft and connected with or to the shaft and that the brake drum is apart from the shaft, that the brake shoe holder is connected to the means which drives the shaft and also to the machinery driven by the shaft, that although the drawings illustrate two brake shoes, that one brake shoe may fulfill the object of the invention, two or more brake shoes all connected in a similar manner with the shaft 30 will better fulfill the object of the invention, and that the gear box 5 supports the brake drum, I do not wish to confine my invention to the above description only as many of the members illustrate means, but more particularly any suitable means for reduction to practice.

The invention contemplates in a broad sense an apparatus which will do separately and collectively all of the following things:

To automatically bring a motor vehicle to a stand still by discontinuing to exert a torque on a drive shaft or axle.

To automatically disengage the brake by exerting a torque on the drive shaft or axle.

To lock the brake in a disengaged position so that the torque may be discontinued while the gear ratio is changed without automatically bringing the car to a standstill while shifting the gears.

It is understood that drawings and descriptions are illustrative only and do not restrict any of the broad claims attached hereto as changes in design may be made without departing from the spirit and scope of the invention.

I claim:

1. The automatic brake which includes, a brake drum secured to a support so that it may not rotate, brake shoes adapted to bear on the brake drum, a brake shoe holder adapted to hold the shoes in place in relation to the brake drum, means for securing the brake shoe holder to machinery adapted to rotate with the brake shoe holder, means for forcing the brake shoes to bear on the brake drum, means for forcing the brake shoes away from the brake drum, means for rotating the brake shoe holder, means for locking the brake shoes so they can not bear on the brake drum, and means for unlocking the brake shoes so that they are free to be forced to bear on the brake drum.

2. The automatic brake which includes brake shoe on a shaft, brake shoe in the holder, bearing surface for the brake shoe, means which constantly tend to force the brake shoes to bear on the said bearing surface thereby holding the shoe the brake shoe holder and the shaft at a standstill, means for moving the shoe away from the said bearing surface in opposition to the means which constantly tend to force the shoe to bear on the said bearing surface thereby freeing the shoe the brake shoe holder and shaft so that they may rotate, automatic means for locking the brake shoe after it is moved away from the bearing surface, and manual means for unlocking the said shoe.

3. The automatic brake which includes brake shoe bearing surface, brake shoe adapted to bear on the said bearing surface, brake shoe holder and shaft adapted to hold the brake shoe in place in relation to said bearing surface, means which constantly tend to force the shoe to bear on the said bearing surface thereby holding the shoe, the holder and the shaft at a standstill, an engine, a clutch adapted to be engaged and disengaged on the drive shaft of the engine, means connected to the clutch and the brake shoe for forcing the shoe away from the said bearing surface when said clutch is clutching the engine and the engine exerts a torque on the means for forcing the shoe away from the said bearing surface and subsequently propels the brake shoe holder and the shaft therewith, means for locking the shoe in a position removed from bearing surface, means for engaging and disengaging the clutch and means for unlocking the shoe with the same means which disengage the clutch but subsequent to disengaging the clutch.

4. The automatic brake which includes a brake shoe, a brake drum secured to a support so that it may not rotate, a brake shoe holder adapted to hold the shoes and to be supported within the brake drum, means which constantly tend to force the brake shoe to bear on the surface of the brake drum thereby holding the brake shoe and the brake shoe holder at a standstill, means for forcing the brake shoe away from the surface of the brake drum in opposition to the means which constantly tend to force the brake shoe to bear on the brake drum thereby freeing the brake shoe holder so that it may rotate, means for automatically locking the brake shoe after same has been forced away from the surface of the brake drum, an engine adapted to propel the brake shoe holder, a shaft secured to the brake shoe holder, wheels of a motor vehicle connected with the shaft so that the engine will propel the brake shoe holder, the shaft and the wheels, a clutch adapted to engage and disengage the engine, a lever adapted to move the means which disengage the clutch, means connected to the said lever for unlocking the brake shoe so that it is free to be forced to bear on the brake drum and means for unlocking the brake shoe after the said lever has moved the clutch to a disengaged position.

5. The automatic brake which includes a brake drum, secured to a transmission gear box, brake shoe holder, brake shoe interlocked in the brake shoe holder, means for supporting brake shoe holder within the brake drum, means which constantly tend to force the brake shoe to bear on the inner surface of the brake drum, an engine adapted to drive the gears in the transmission gear box, a clutch on the drive shaft of the engine adapted to engage the engine to the gears and to disengage the engine so that it may not drive the gears, a lever adapted to move the means for disengaging said clutch, a shaft leading from the gear box, an arm on the shaft, a link connecting the arm to the shoe so that when the engine exerts a torque on the shaft leading from the gear box the shoe will be pulled inward away from the inner surface of the brake drum and the shoe and the shoe holder will rotate with the shaft that leads from the gear box, means for automatically locking the shoe after same has been pulled away from the inner surface of the brake drum so that the means which constantly tend to force the shoe towards the brake drum may not force the brake shoe to bear on the brake drum, a shaft secured to the brake shoe holder and adapted to rotate with the brake shoe holder and to drive the wheels of a motor vehicle and means for unlocking the brake shoe so that when a torque is not exerted on the shaft leading from the gear box the shoe is free to be forced to bear on the inner surface of the brake drum.

ANDREW L. STILL.